(12) United States Patent
Kawano et al.

(10) Patent No.: US 12,122,405 B2
(45) Date of Patent: Oct. 22, 2024

(54) VEHICLE CONTROL DEVICE, STORAGE MEDIUM FOR STORING COMPUTER PROGRAM FOR VEHICLE CONTROL, AND METHOD FOR CONTROLLING VEHICLE

(71) Applicant: TOYOTA JIDOSHA KABUSHIKI KAISHA, Toyota (JP)

(72) Inventors: Takahiro Kawano, Tokyo-to (JP); Ryuta Hashimoto, Tokyo-to (JP); Takahiro Seta, Yokohama (JP); Kota Harada, Tokyo-to (JP); Yuki Mori, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 381 days.

(21) Appl. No.: 17/656,990

(22) Filed: Mar. 29, 2022

(65) Prior Publication Data

US 2022/0315028 A1    Oct. 6, 2022

(30) Foreign Application Priority Data

Mar. 30, 2021    (JP) ................................ 2021-058207

(51) Int. Cl.
*B60W 50/14*    (2020.01)
*G01C 21/00*    (2006.01)
*G01C 21/34*    (2006.01)

(52) U.S. Cl.
CPC ......... *B60W 50/14* (2013.01); *G01C 21/3461* (2013.01); *G01C 21/387* (2020.08);
(Continued)

(58) Field of Classification Search
CPC ........... B60W 50/14; B60W 2050/146; B60W 2420/403; B60W 2554/4045; G01C 21/3461; G01C 21/387; G01C 21/3896
See application file for complete search history.

(56) References Cited

U.S. PATENT DOCUMENTS

2018/0217604 A1    8/2018    Nakajima
2020/0369281 A1    11/2020    Sato
2022/0306156 A1*   9/2022    Wray .................. G06V 20/588

FOREIGN PATENT DOCUMENTS

JP    2013019788 A    1/2018
JP    2020189543 A    11/2020
(Continued)

*Primary Examiner* — Ian Jen
*Assistant Examiner* — Renee LaRose
(74) *Attorney, Agent, or Firm* — Dickinson Wright, PLLC

(57) ABSTRACT

A vehicle control device has a processor configured to determine whether a first road exists where the vehicle is to exit from the traveling road, and when a first road exists, to set a lane change schedule zone based on a first connecting location, to determine whether a second road located on the same side of the traveling direction of the vehicle as the first road exists between the current location of the vehicle and the first connecting location, to change a start location of the lane change schedule zone based on a second connecting location, when a second road exists and the start location of the lane change schedule zone is at a second connecting location, or before the second connecting location, and to notify the driver of the plan to move the vehicle between lanes while the vehicle is traveling in the lane change schedule zone.

5 Claims, 8 Drawing Sheets

(52) U.S. Cl.
CPC ... *G01C 21/3896* (2020.08); *B60W 2050/146* (2013.01); *B60W 2420/403* (2013.01); *B60W 2554/4045* (2020.02)

(56) References Cited

FOREIGN PATENT DOCUMENTS

| | | |
|---|---|---|
| JP | 2021038979 A | 3/2021 |
| WO | 2017017761 A1 | 2/2017 |

\* cited by examiner

VEHICLE CONTROL DEVICE, STORAGE MEDIUM FOR STORING COMPUTER PROGRAM FOR VEHICLE CONTROL, AND METHOD FOR CONTROLLING VEHICLE

FIELD

The present disclosure relates to a vehicle control device, to a medium storing a computer program for vehicle control, and to a method for controlling a vehicle.

BACKGROUND

An automatic control system mounted in a vehicle creates a navigation route for the vehicle based on the current location of the vehicle, the destination location of the vehicle, and a navigation map. The automatic control system estimates the current location of the vehicle using the map information and controls the vehicle to travel along the navigation route. The automatic control system also controls operation of the vehicle, including its movement between traffic lanes.

When the vehicle is to exit from the traveling road on which it is traveling onto a branching road, the automatic control system defines a lane change schedule zone for movement to the branching road, on the traveling lane of the traveling road. In the lane change schedule zone, the automatic control system controls operation of the vehicle so that the driver is notified of the plan for the lane change while flashing of the turn signal is started, and the vehicle moves to a traffic lane on the branching road (see Japanese Unexamined Patent Publication No. 2020-189543, for example).

SUMMARY

It is often the case that a different branching road is present before a branching road where the vehicle is expected to exit from the traveling road. If the distance between the branch-scheduled branching road and the branching road before it, where branching is not scheduled, is shorter than the length of the lane change schedule zone, then the notification by the automatic control system to the driver of the plan to make the lane change will occur while the vehicle is in the lane change schedule zone near the branching road that is before, where branching is not scheduled. Therefore, the driver that has been notified may mistakenly think that the branching off is to be on the branching road that is before.

It is an object of the present disclosure to provide a vehicle control device that, when a different branching road is present before a branching road where an exit from the traveling road is scheduled, is able to give the driver notification of a plan for the vehicle to move between lanes so as to avoid misunderstanding that the exit is to be onto the branching road before.

One embodiment of the invention provides a vehicle control device. The vehicle control device has a road assessing unit that determines whether or not a first road where the vehicle is to exit from the traveling road on which the vehicle is traveling exists within a predetermined driving zone of a navigation route, based on the current location of the vehicle, the navigation route and map information, and determines whether or not a second road that is located on the same side of the traveling direction of the vehicle as the first road and can be exited by the vehicle exists between the current location of the vehicle and a first connecting location where the traveling road and first road are connected, based on the map information, a lane change schedule zone setting unit that sets a lane change schedule zone on a traveling lane based on the first connecting location when the first road exists, a start location changing unit that changes a start location of the lane change schedule zone based on a second connecting location where the second road connects with the traveling road, when a second road exists and the start location of the lane change schedule zone is at the second connecting location, or before the second connecting location and a notification control unit that notifies the driver of the plan to move the vehicle between lanes via a notification unit, while the vehicle is traveling in the lane change schedule zone.

This vehicle control device preferably also comprises a start location correcting unit that moves the start location of the lane change schedule zone to a more front side location when it is estimated that the first connecting location can be recognized by the driver at the second connecting location, than when it is estimated that the first connecting location cannot be recognized by the driver at the second connecting location, based on the navigation route and map information.

In this vehicle control device, the start location changing unit preferably changes the start location of the lane change schedule zone to the second connecting location, and when the start location of the lane change schedule zone has been changed to the second connecting location, the lane change schedule zone setting unit sets the lane change schedule zone between the first connecting location and the second connecting location as the lane change schedule zone for movement between lanes by automatic control.

In this vehicle control device, the start location changing unit preferably changes the start location of the lane change schedule zone to the second connecting location, and when the start location of the lane change schedule zone has been changed to the second connecting location, the lane change schedule zone setting unit sets the lane change schedule zone between the first connecting location and the second connecting location as the lane change schedule zone for movement between lanes by manual control.

According to another embodiment, a non-transitory storage medium storing a computer program for vehicle control is provided. The computer program for vehicle control causes a processor to execute a process, the process includes determining whether or not a first road where the vehicle is to exit from the traveling road on which the vehicle is traveling exists within a predetermined driving zone of a navigation route, based on the current location of the vehicle, the navigation route and map information, setting a lane change schedule zone on a traveling lane based on a first connecting location where the traveling road and the first road are connected, when the first road exists, determining whether or not a second road that is located on the same side of the traveling direction of the vehicle as the first road and can be exited by the vehicle exists between the current location of the vehicle and the first connecting location, based on the map information, changing a start location of the lane change schedule zone based on a second connecting location where the second road connects with the traveling road, when a second road exists and the start location of the lane change schedule zone is at the second connecting location, or before the second connecting location; and notifying the driver of the plan to move the vehicle between lanes via a notification unit, while the vehicle is traveling in the lane change schedule zone.

Another embodiment of the invention provides a method for controlling a vehicle. The method for controlling a vehicle is carried out by a vehicle control device and the method includes determining whether or not a first road where the vehicle is to exit from the traveling road on which the vehicle is traveling exists within a predetermined driving zone of a navigation route, based on the current location of the vehicle, the navigation route and map information, setting a lane change schedule zone on a traveling lane based on a first connecting location where the traveling road and the first road are connected, when the first road exists, determining whether or not a second road that is located on the same side of the traveling direction of the vehicle as the first road and can be exited by the vehicle exists between the current location of the vehicle and the first connecting location, based on the map information, changing a start location of the lane change schedule zone based on a second connecting location where the second road connects with the traveling road, when a second road exists and the start location of the lane change schedule zone is at the second connecting location, or before the second connecting location; and notifying the driver of the plan to move the vehicle between lanes via a notification unit, while the vehicle is traveling in the lane change schedule.

Since the vehicle control device of the present disclosure notifies the driver that the vehicle is to move between lanes after the vehicle has passed a second connecting location, it can avoid misunderstanding by the driver that the vehicle is to exit to a second road at the second connecting location.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Figure 1:
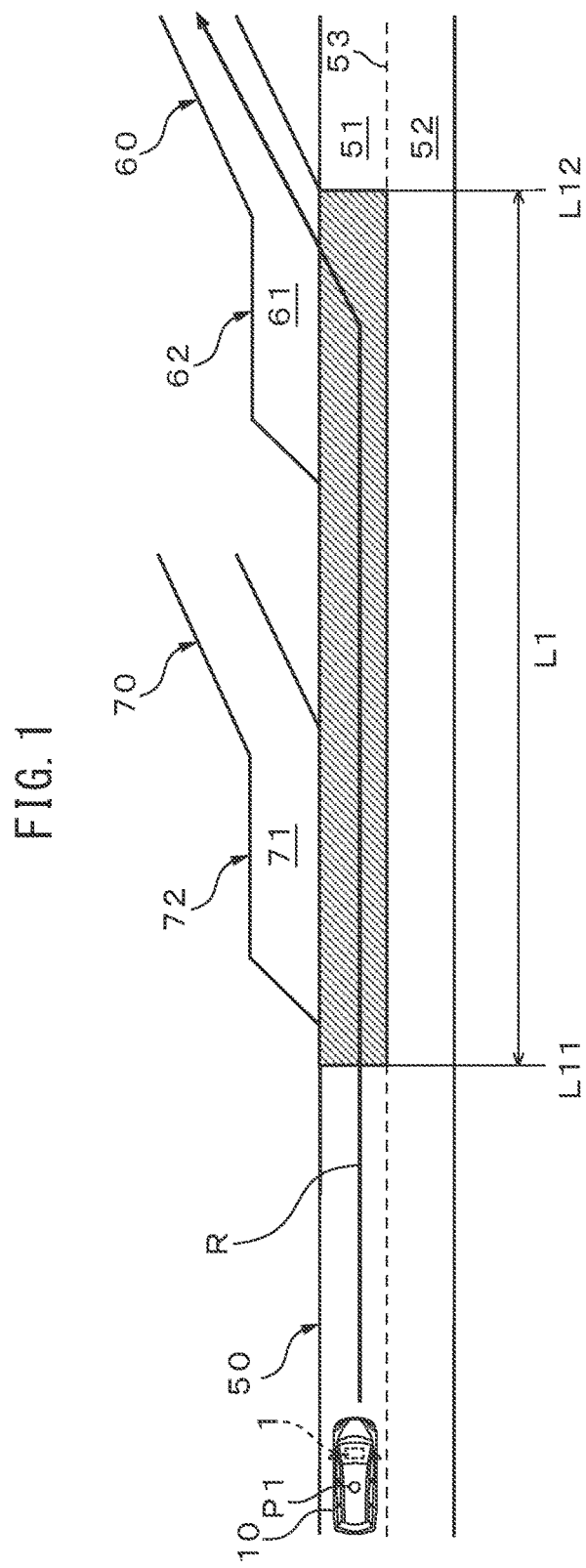
FIG. 1 is a diagram illustrating in overview the operation of a vehicle control system according to a first embodiment (1).
Figure 2:
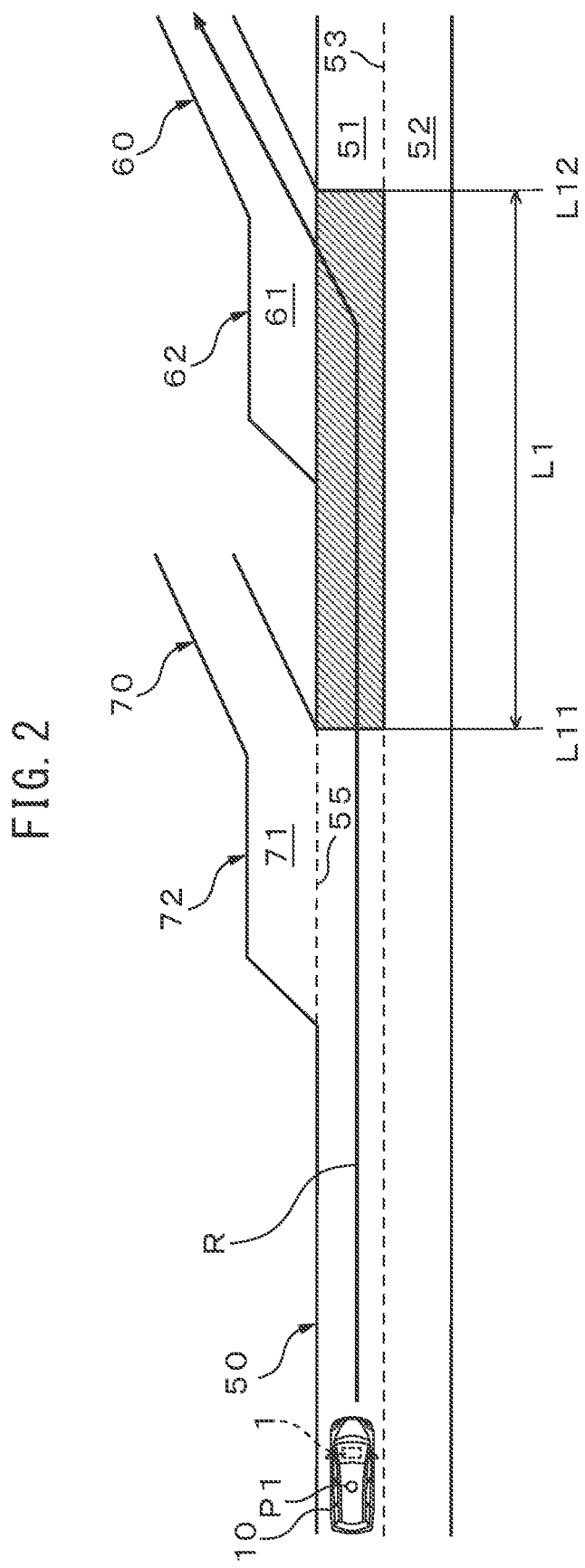
FIG. 2 is a diagram illustrating in overview the operation of a vehicle control system according to a first embodiment (2).

FIG. 1 and FIG. 2 are diagrams illustrating in overview the operation of a vehicle control system 1 according to the first embodiment. Operation relating to vehicle control processing by the vehicle control system 1 disclosed herein will now be described in overview with reference to FIG. 1 and FIG. 2. The vehicle control system 1 is an example of a vehicle control device.

FIG. 1 shows an example of a navigation route R generated by a vehicle control system 1 mounted in a vehicle 10. The automatically controlled vehicle 10 is traveling on a road 50 at a current location P1 and is expected to exit to a branching road 60 at a branching location 62. The road 50 is an example of a traveling road, and the branching road 60 is an example of a first road.

The vehicle 10 is traveling on one traffic lane 51 of the road 50 having traffic lanes 51, 52. The traffic lane 51 and traffic lane 52 are divided by a lane marking line 53. The traffic lane 51 of the road 50 and the traffic lane 61 of the branching road 60 are connected at the branching location 62, in a manner allowing movement of the vehicle 10.

The vehicle control system 1 determines that a branching road 60 exists where the vehicle 10 will exit from the road 50 in which it is traveling, within the nearest driving zone of the navigation route R, based on the current location P1 of the vehicle, the navigation route R and the map information.

The vehicle control system 1 sets a lane change schedule zone L1 of a predetermined length on the traffic lane 51 of the road 50, based on the connecting location 62 where the road 50 and branching road 60 connect. The lane change schedule zone L1 may include an automatic lane change schedule zone or a manual lane change schedule zone. In the automatic lane change schedule zone, the vehicle control system 1 drives the vehicle 10 by automatic control, attempting to move from the traffic lane 51 to the traffic lane 61. In the manual lane change schedule zone, the vehicle control system 1 notifies the driver of a request to move from the traffic lane 52 to the traffic lane 51 by manual control. The driver manually controls at least steering of the vehicle 10 to attempt to move the vehicle 10 from the traffic lane 51 to the traffic lane 61.

Based on the map information, the vehicle control system 1 also determines that a branching road 70 exists between the current location P1 of the vehicle 10 and the connecting location 62, which is located on the same side of the traveling direction of the vehicle 10 as the branching road 60 and can be exited by the vehicle 10. The traffic lane 51 of the road 50 and the traffic lane 71 of the branching road 70 are connected at the branching location 72, in a manner allowing movement of the vehicle 10. The branching road 70 is an example of a second road.

The vehicle control system 1 notifies the driver of the plan to move the vehicle 10 between lanes, while the vehicle 10 is traveling on the lane change schedule zone L1. Since the start location L11 of the lane change schedule zone L1 is before the connecting location 72 where the branching road 70 and road 50 connect, the driver who has been notified can potentially misunderstand that the vehicle 10 is to exit to the branching road 70 that is before the branching road 60. For example, since the vehicle 10 is proceeding on the road 50 toward the branching location 62 at the branching location 72, the driver noticing that the vehicle 10 does not exit to the branching road 70 may attempt to operate the vehicle 10 by manual control to exit from the road 50 to the branching road 70.

Since the start location L11 of the lane change schedule zone L1 is before the connecting location 72 where the branching road 70 connects with the road 50, the vehicle control system 1 changes the start location L11 of the lane change schedule zone L1 based on the connecting location 72, as shown in FIG. 2. In the example shown in FIG. 2, the vehicle control system 1 changes the start location L11 to the connecting location 72.

The vehicle control system 1 sets the lane change schedule zone L1 with the changed start location on the traffic lane 51. The lane change schedule zone L1 is the zone between the connecting location 72 and the connecting location 62, on the traffic lane 51. The lane change schedule zone L1 may include an automatic lane change schedule zone or a manual lane change schedule zone. The vehicle control system 1 notifies the driver of moving plan information representing the plan to move the vehicle 10 between lanes, while the vehicle 10 is traveling on the lane change schedule zone L1.

Since the driver is thus notified of the plan for the vehicle 10 to move between lanes after the vehicle 10 has passed the connecting location 72, it is possible to prevent misunderstanding by the driver that the vehicle 10 is to exit onto the branching road 70 at the connecting location 72.

Figure 3:
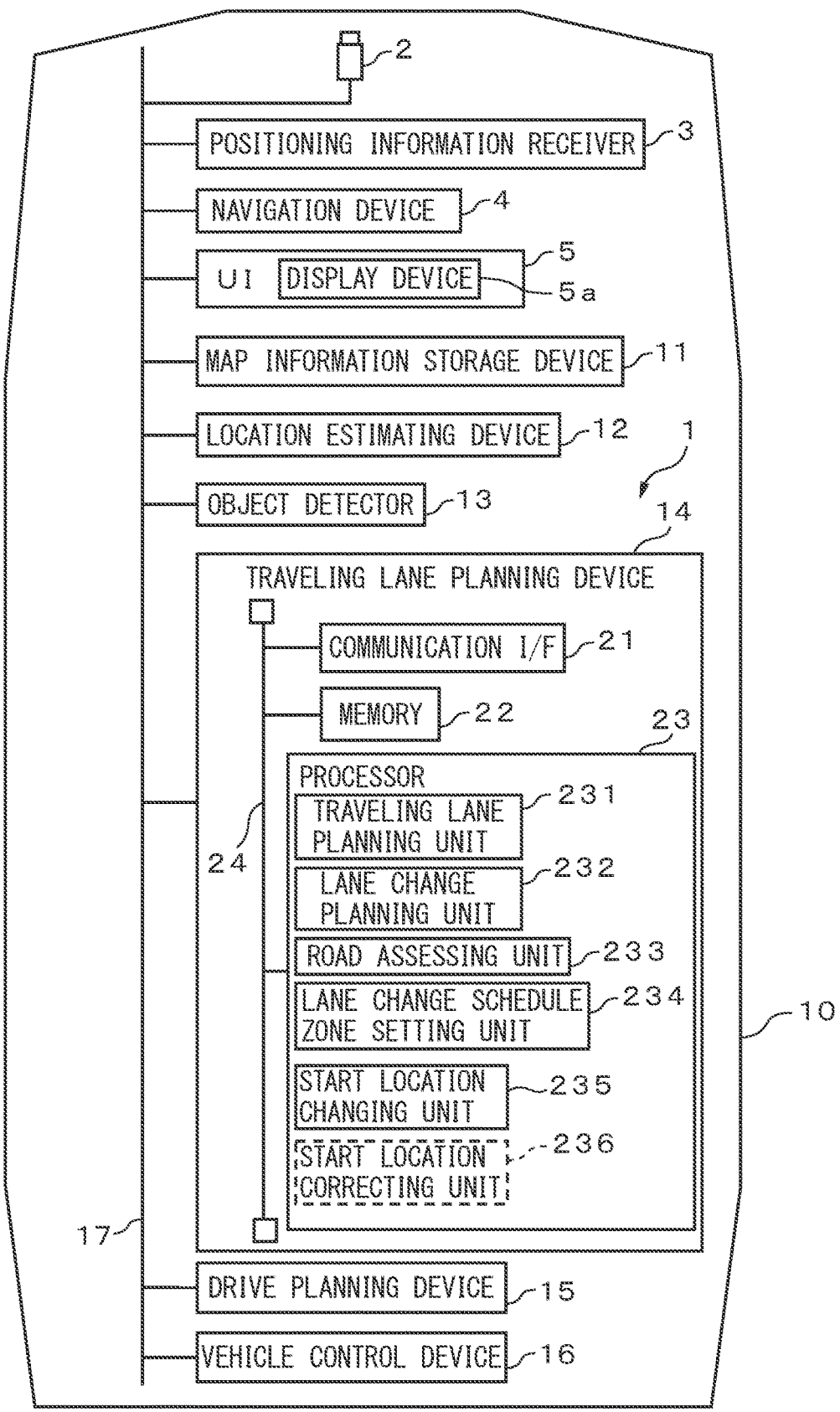
FIG. 3 is a general schematic drawing of a vehicle in which the vehicle control system of the first embodiment is mounted.

FIG. 3 is a general schematic drawing of a vehicle 10 in which the vehicle control system 1 is mounted. The vehicle 10 has a camera 2, a positioning information receiver 3, a navigation device 4, a user interface (UI) 5, a map information storage device 11, a location estimating device 12, an object detector 13, a traveling lane planning device 14, a drive planning device 15 and a vehicle control device 16 etc. The vehicle 10 may also have a LiDAR sensor, as a distance sensor (not shown) for measurement of the distance of the vehicle 10 to surrounding objects.

The camera 2, positioning information receiver 3, navigation device 4, UI 5, map information storage device 11, location estimating device 12, object detector 13, traveling lane planning device 14, drive planning device 15 and vehicle control device 16 are connected in a communicable manner through an in-vehicle network 17 that conforms to controller area network standards.

The camera 2 is an example of an imaging unit provided in the vehicle 10. The camera 2 is mounted inside the vehicle 10 and directed toward the front of the vehicle 10. The camera 2, for example, takes a camera image in which the environment of a predetermined region ahead of the vehicle 10 is shown, at a predetermined cycle. The camera image can show the road in the predetermined region ahead of the vehicle 10, and road features such as surface lane marking lines on the road. The camera 2 has a 2D detector composed of an array of photoelectric conversion elements with visible light sensitivity, such as a CCD or C-MOS, and an imaging optical system that forms an image of the photographed region on the 2D detector.

Each time a camera image is taken, the camera 2 outputs the camera image and the camera image photograph time at which the camera image was taken, through the in-vehicle network 17 to the location estimating device 12 and object detector 13. The camera image is also used for processing at the location estimating device 12 to estimate the location of the vehicle 10. At the object detector 13, the camera image is used for processing to detect other objects surrounding the vehicle 10.

The positioning information receiver 3 outputs positioning information that represents the current location of the vehicle 10. The positioning information receiver 3 may be a GNSS receiver, for example. The positioning information receiver 3 outputs positioning information and the positioning information acquisition time at which the positioning information has been acquired, to the navigation device 4 and map information storage device 11 etc., each time positioning information is acquired at a predetermined receiving cycle.

Based on the navigation map information, the destination location of the vehicle 10 input through the UI 5, and positioning information representing the current location of the vehicle 10 input from the positioning information receiver 3, the navigation device 4 creates a navigation route R from the current location to the destination location of the vehicle 10. The navigation route R includes information relating to the locations of right turns, left turns, merging and branching. When the destination location has been newly set or the current location of the vehicle 10 has exited the navigation route R, the navigation device 4 creates a new navigation route R for the vehicle 10. Every time a navigation route R is created, the navigation device 4 outputs the navigation route R to the location estimating device 12 and the traveling lane planning device 14 etc., via the in-vehicle network 17.

The UI 5 is an example of the notifying unit. The UI 5, controlled by the navigation device 4 and vehicle control device 16, notifies the driver of the vehicle 10 traveling information, the moving plan information or the movement request. The moving plan information represents the plan to move the vehicle between lanes. The movement request is a request for the driver to drive the vehicle by manual control to move between lanes, in the manual lane change schedule zone. The UI 5 also creates an operation signal in response to operation of the vehicle 10 by the driver. The traveling information of the vehicle 10 includes information relating to the current location of the vehicle and the current and future route of the vehicle, such as the navigation route. The UI 5 has a display device 5a such as a liquid crystal display or touch panel, for display of the traveling information. The UI 5 may also have an acoustic output device (not shown) to notify the driver of traveling information. The UI 5 also has a touch panel or operating button, for example, as an input device for inputting operation information from the driver to the vehicle 10. The operation information may be, for example, a destination location, transit points, vehicle speed or other control information of the vehicle 10. The UI 5 outputs the input operation information to the navigation device 4 and the vehicle control device 16 etc., via the in-vehicle network 17.

The map information storage device 11 stores wide-area map information for a relatively wide area (an area of 10 to 30 km², for example) that includes the current location of the vehicle 10. The map information preferably has high precision map information including three-dimensional information for the road surface, information for the types and locations of structures and road features such as road lane marking lines, and the legal speed limit for the road. The map information storage device 11 receives the wide-area map information from an external server via a base station, by wireless communication through a wireless communication device (not shown) mounted in the vehicle 10, in relation to the current location of the vehicle 10, and stores it in the storage device. Each time positioning information is input from the positioning information receiver 3, the map information storage device 11 refers to the stored wide-area map information and outputs map information for a relatively narrow area including the current location represented by the positioning information (for example, an area of 100 m² to 10 km²), through the in-vehicle network 17 to the location estimating device 12, object detector 13, traveling lane planning device 14, drive planning device 15 and vehicle control device 16 etc.

The location estimating device 12 estimates the location of the vehicle 10 at the camera image photograph time, based on the road features surrounding the vehicle 10 represented in the camera image. For example, the location estimating device 12 compares lane marking lines identified in the camera image with lane marking lines represented in the map information input from the map information storage device 11, and determines the estimated location and estimated declination of the vehicle 10 at the camera image photograph time. The location estimating device 12 estimates the road traveling lane where the vehicle 10 is located, based on the lane marking lines represented in the map information and on the estimated location and estimated declination of the vehicle 10. Each time the estimated location, estimated declination and traveling lane of the vehicle 10 are determined at the camera image photograph time, the location estimating device 12 outputs this information to the object detector 13, traveling lane planning device 14, drive planning device 15 and vehicle control device 16 etc.

The object detector 13 detects other objects around the vehicle 10 and their types (for example, vehicles) based on the camera image, for example. Other objects also include other vehicles traveling around the vehicle 10. The object detector 13 tracks other detected objects and determines the trajectories of the other objects. In addition, the object detector 13 identifies the traveling lanes in which the other objects are traveling, based on the lane marking lines represented in the map information and the locations of the objects. The object detector 13 outputs object detection information which includes information representing the types of other objects that were detected, information indicating their locations, and also information indicating their traveling lanes, to the traveling lane planning device 14 and drive planning device 15 etc.

At a traveling lane-planning creation time set in a predetermined cycle, the traveling lane planning device 14 selects a traffic lane on the road on which the vehicle 10 is traveling, within the nearest driving zone (for example, 10 km) selected from the navigation route, based on the map information, the navigation route and surrounding environment information and the current location of the vehicle 10, and creates a traveling lane plan representing the scheduled traveling lane for traveling of the vehicle 10. For example, the traveling lane planning device 14 creates a traveling lane plan for the vehicle 10 to travel on a traffic lane other than a passing traffic lane. Each time a traveling lane plan is created, the traveling lane planning device 14 outputs the drive planning device 15 of the traveling lane plan.

The traveling lane planning device 14 also determines whether or not a lane change is necessary within the nearest driving zone selected from the navigation route R, based on the traveling lane plan, the map information, the navigation route R and the current location of the vehicle 10, and generates a lane change plan in accordance with the assessment results. Specifically, the traveling lane planning device 14 determines whether or not a lane change is necessary for moving to a traffic lane toward the destination location of the vehicle 10, based on the navigation route R and the current location of the vehicle 10. It is determined whether or not the vehicle 10 is approaching another road that merges ahead from the traveling road on which it is currently traveling (merge), or the vehicle 10 is exiting onto another road branching out ahead from the traveling road (branch). Since merging and branching involve movement of the vehicle from a lane of the traveling road to a lane in another road, a lane change is carried out. The traveling lane planning device 14 may further utilize surrounding environment information or vehicle status information to determine whether or not a lane change is necessary. The surrounding environment information includes the locations and speeds of other vehicles traveling around the vehicle 10. The vehicle status information includes the current location of the vehicle 10, and the vehicle speed, acceleration and traveling direction. The traveling lane planning device 14 also generates a lane change plan in response to a driver request. When a lane change plan has been generated, the traveling lane planning device 14 outputs the traveling lane plan with the added lane change plan to the drive planning device 15.

The traveling lane planning device 14 also determines whether or not a first road exists where the vehicle 10 is to exit from the traveling road on which it is traveling, within a predetermined driving zone of the navigation route R, based on the current location of the vehicle 10, the navigation route R and the map information. When a first road exists, the traveling lane planning device 14 sets the lane change schedule zone on the traveling lane based on the first connecting location where the traveling road and the first road connect. Based on the map information, the traveling lane planning device 14 also determines whether or not a second road exists between the current location of the vehicle 10 and the first connecting location, which is located on the same side of the traveling direction of the vehicle 10 as the first road and can be exited by the vehicle 10. When a second road exists and the start location of the lane change schedule zone is at a second connecting location where the second road connects with the traveling road, or before the second connecting location, the traveling lane planning device 14 changes the start location of the lane change schedule zone based on the second connecting location. While the vehicle 10 is traveling in the lane change schedule zone, the traveling lane planning device 14 also adds to the traveling lane plan a notification to the driver of the plan for the vehicle 10 to move between lanes. The traveling lane planning device 14 comprises a communication interface (IF) 21, a memory 22 and a processor 23 for this purpose. The communication interface 21, memory 22 and processor 23 are connected via signal wires 24. The communication interface 21 has an interface circuit to connect the traveling lane planning device 14 with the in-vehicle network 17.

All or some of the functions of the traveling lane planning device 14 are functional modules driven by a computer program operating on the processor 23, for example. The processor 23 has a traveling lane planning unit 231, a lane change planning unit 232, a road assessing unit 233, a lane change schedule zone setting unit 234 and a start location changing unit 235. Alternatively, the functional module of the processor 23 may be a specialized computing circuit in the processor 23. The processor 23 comprises one or more CPUs (Central Processing Units) and their peripheral circuits. The processor 23 may also have other computing circuits such as a logical operation unit, numerical calculation unit or graphic processing unit. The memory 22 is an example of a memory unit, and it has a volatile semiconductor memory and a non-volatile semiconductor memory, for example. The memory 22 stores an application computer program and various data to be used for information processing carried out by the processor 23 of each device. The traveling lane planning unit 231 generates the aforementioned traveling lane plan while the lane change planning unit 232 generates the aforementioned lane change plan. Other details regarding operation of the traveling lane planning device 14 are described below.

At a driving plan creation time set with a predetermined cycle, the drive planning device 15 carries out driving plan processing in which it creates a driving plan representing the scheduled traveling trajectory of the vehicle 10 up until a predetermined time (for example, 5 seconds), based on the traveling lane plan, the map information, the current location of the vehicle 10, the surrounding environment information and the vehicle status information. The driving plan is represented as a combination of the target location of the vehicle 10 and the target vehicle speed at the target location, at each time from the current time until the predetermined time. The cycle in which the driving plan is created is preferably shorter than the cycle in which the traveling lane plan is created. The drive planning device 15 generates a driving plan to maintain a spacing of at least a predetermined distance between the vehicle 10 and other vehicles. When the traveling lane plan includes a lane change wherein the vehicle 10 is to move between lanes, but a spacing of at least a predetermined distance cannot be ensured between the vehicle 10 and another vehicle, the drive planning device 15 generates a driving plan for stopping the vehicle 10. The drive planning device 15 outputs the driving plan to the vehicle control device 16 for each driving plan generated.

When the vehicle 10 is operated by automatic control, the vehicle control device 16 controls each unit of the vehicle 10 based on the current location of the vehicle 10 and the vehicle speed and yaw rate, as well as on the driving plan generated by the drive planning device 15. For example, the vehicle control device 16 determines the steering angle, acceleration and angular acceleration of the vehicle 10 according to the driving plan and the speed and yaw rate of the vehicle 10, and sets the amount of steering, and the accelerator or brake level so as to match that steering angle, accelerator level and angular acceleration. The vehicle control device 16 also outputs a control signal corresponding to a set steering amount, to an actuator (not shown) that controls the steering wheel for the vehicle 10, via the in-vehicle network 17. The vehicle control device 16 also determines the amount of fuel injection according to a set accelerator level, and outputs a control signal corresponding to the amount of fuel injection to a drive unit (not shown) of the engine of the vehicle 10, via the in-vehicle network 17. Alternatively, the vehicle control device 16 may output a control signal corresponding to a set brake level to the brake (not shown) of the vehicle 10, via the in-vehicle network 17. When the vehicle 10 is operated by manual control, the vehicle control device 16 controls the steering wheel, drive unit or brake according to the amount of driver-operated steering, accelerator or brake level.

For FIG. 3, the map information storage device 11, location estimating device 12, object detector 13, traveling lane planning device 14, drive planning device 15 and vehicle control device 16 were explained as separate devices, but all or some of them may be constructed in a single device.

Figure 4:
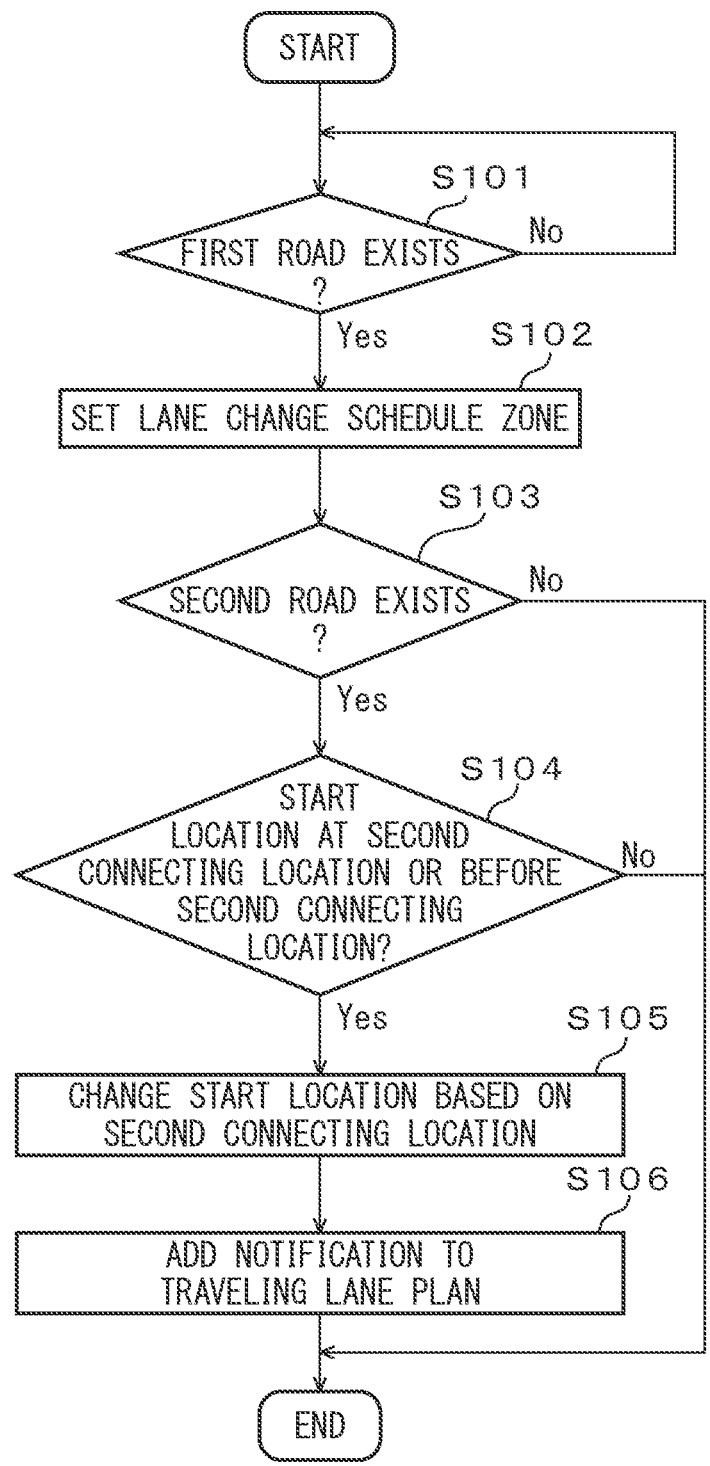
FIG. 4 is an example of an operation flow chart for vehicle control processing by the vehicle control system of the first embodiment.

FIG. 4 is an example of an operation flow chart for vehicle control processing by the vehicle control system 1 of the first embodiment. Vehicle control processing by the vehicle control system 1 will be described below with reference to FIG. 4. The traveling lane planning device 14 carries out road assessment processing according to the operation flow chart shown in FIG. 4, at a road assessment time having a predetermined cycle. The cycle in which the road assessment processing is carried out is preferably shorter than the cycle in which the traveling lane plan is created.

The road assessing unit 233 first determines whether or not a first road exists where the vehicle 10 is to exit from the traveling road in which it is traveling, within a predetermined driving zone of the navigation route R, based on the current location of the vehicle 10, the navigation route R and the map information (step S101). When a first road does not exist (step S101-No), the road assessing unit 233 waits until the next road assessment time and carries out the processing of step S101.

When a first road does exist (step S101—Yes), the lane change schedule zone setting unit 234 sets the lane change schedule zone on the traveling lane based on the first connecting location where the traveling road and first road connect (step S102).

Next, based on the map information, the road assessing unit 233 determines whether or not a second road exists between the current location of the vehicle 10 and the first connecting location where the traveling road and first road are connected, which is located on the same side of the traveling direction of the vehicle 10 as the first road and can be exited by the vehicle 10 (step S103).

When a second road exists (step S103—Yes), the start location changing unit 235 determines whether or not the start location of the lane change schedule zone is at a second connecting location where the second road connects with the traveling road, or before the second connecting location (step S104).

When the start location is before the second connecting location where the second road connects with the traveling road (step S104—Yes), the start location changing unit 235 changes the start location of the lane change schedule zone based on the second connecting location. (Step S105).

The lane change schedule zone setting unit 234 then adds to the traveling lane plan a notification to the driver of the moving plan information for the plan of moving the vehicle 10 between lanes (step S106), while the vehicle 10 is traveling in the lane change schedule zone, thus completing the series of processing steps.

When a second road does not exist (step S103—No), or the start location is not before the second connecting location where the second road connects with the traveling road (step S104—No), the series of processing steps is complete.

The traveling lane planning device 14 does not need to carry out the processing shown in FIG. 4 for a first road for which it has already carried out road assessment processing.

An operating example of the vehicle control system 1 will now be further explained with reference to FIGS. 5 to 7.

Figure 5:
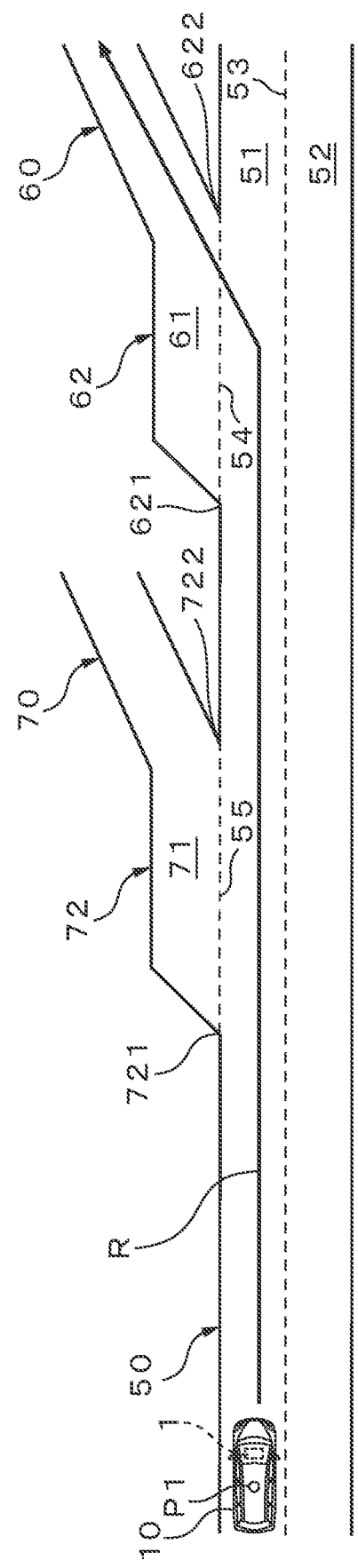
FIG. 5 is a diagram showing an example of a navigation route.

FIG. 5 shows an example of a navigation route R input from the navigation device 4. The example shown in FIG. 5 corresponds to FIG. 1 and FIG. 2, where the navigation route R shows the vehicle 10 exiting onto a branching road 60 at a branching location 62 after it has traveled on the road 50. The branching road 60 branches from the road 50 toward the left side, at the branching location 62.

The vehicle 10 is traveling on one traffic lane 51 of the road 50 having traffic lanes 51, 52. The traffic lane 51 and traffic lane 52 are divided by a lane marking line 53. The traffic lane 51 of the road 50 and the traffic lane 61 of the branching road 60 are divided by a lane marking line 54. The traffic lane 51 of the road 50 and the traffic lane 61 of the branching road 60 are connected at the branching location 62 between a branching start location 621 and a branching end location 622, in a manner allowing movement of the vehicle 10.

The branching end location 622 may be considered to be the intersection between the lane marking line dividing the traffic lane 61 of the branching road 60, and the lane marking line dividing the traffic lane 51 of the road 50 (a "soft nose"). Alternatively, the branching end location 622 may be the intersection between the side section of the branching road 60 and the side section of the road 50 (a "hard nose").

In the navigation route R, a branching road 70 exists between the current location P1 of the vehicle 10 and the connecting location 62, which is located on the same side of the traveling direction of the vehicle 10 as the branching road 60 and can be exited by the vehicle 10. The branching road 70 branches from the road 50 toward the side, at the branching location 72. The traffic lane 51 of the road 50 and the traffic lane 71 of the branching road 70 are divided by a lane marking line 55. The traffic lane 51 of the road 50 and the traffic lane 71 of the branching road 70 are connected at the branching location 72 between a branching start location 721 and a branching end location 722, in a manner allowing movement of the vehicle 10. As used herein, the "branching location 72" is the zone between the branching start location 721 and the branching end location 722.

Figure 6:
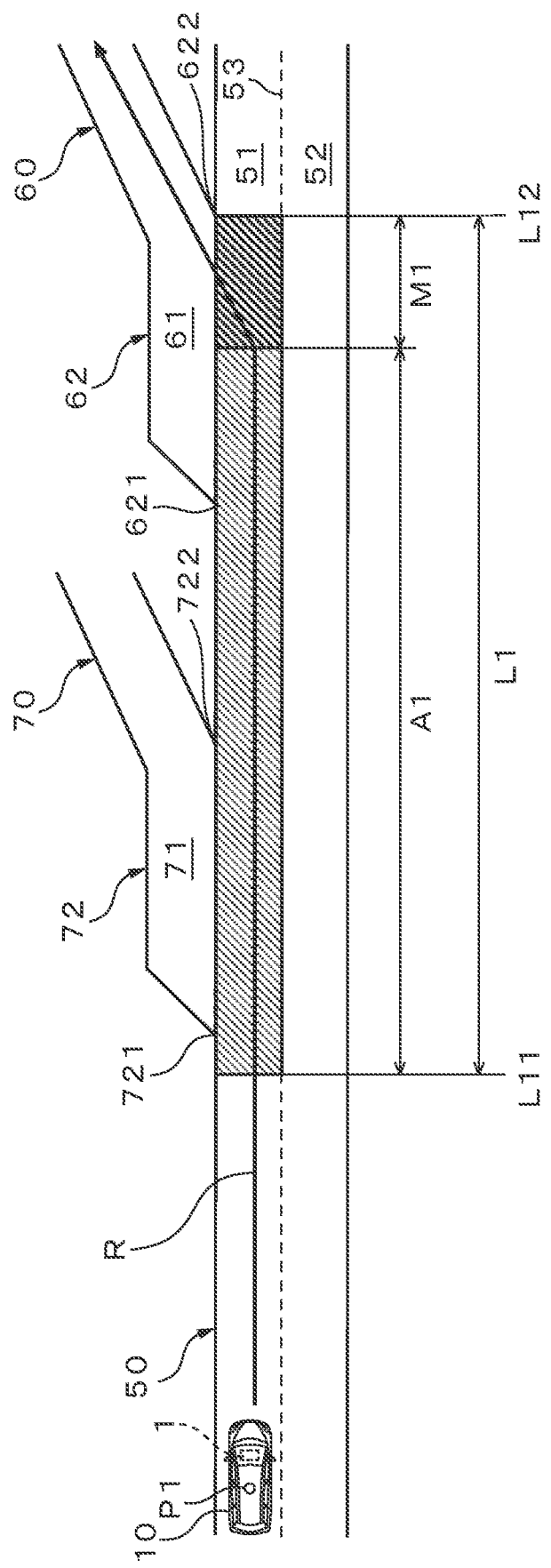
FIG. 6 is a diagram illustrating an example of vehicle control processing (1).
Figure 7:
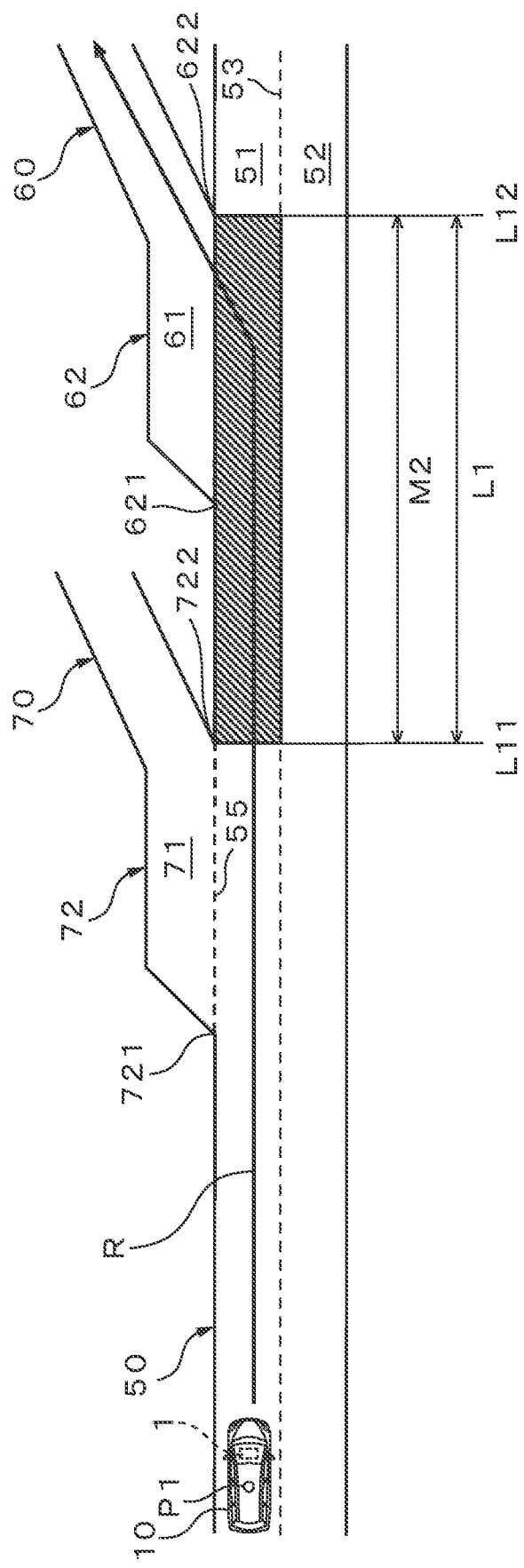
FIG. 7 is a diagram illustrating an example of vehicle control processing (2).

FIG. 6 and FIG. 7 are diagrams illustrating examples of vehicle control processing. The road assessing unit 233 determines that a branching road 60 exists where the vehicle 10 will exit from the road 50 in which it is traveling, within the nearest driving zone of the navigation route R, based on the current location P1 of the vehicle 10, the navigation route R and the map information.

As shown in FIG. 6, the lane change schedule zone setting unit 234 sets a lane change schedule zone L1 of a predetermined length on the traffic lane 51 of the road 50, based on the connecting location 62 where the road 50 and branching road 60 connect. The lane change schedule zone setting unit 234 sets the lane change schedule zone L1 to be a zone at a predetermined distance before the branching end location 622. The start location L11 of the lane change schedule zone L1 is a location before the branching end location 622 by a predetermined length, in the direction in which the road 50 extends. The end location L12 of the lane change schedule zone L1 matches the branching end location 622 in the direction in which the road 50 extends.

In the lane change schedule zone L1, an automatic lane change schedule zone A1 and manual lane change schedule zone B1 are situated in front in the traveling direction of the vehicle 10. The automatic lane change schedule zone A1 is preferably situated on the traffic lane 51 so that the end location is located between the branching start location 621 and the branching end location 622. In the automatic lane change schedule zone A1, the vehicle control system 1 operates the vehicle 10 by automatic control, attempting to move from the traffic lane 51 of the road 50 to the traffic lane 61 of the branching road 60. In the automatic lane change schedule zone A1, the effects of other vehicles may prevent the vehicle control system 1 from being able to operate the vehicle 10 by automatic control and move it from the traffic lane 51 of the road 50 to the traffic lane 51 of the branching road 60. For this reason the manual lane change schedule zone M1 is set on the traveling direction side of the automatic lane change schedule zone A1. The distance of the automatic lane change schedule zone A1 is set based on the most recent average speed of the vehicle 10, for example. The manual lane change schedule zone B1 is situated between the automatic lane change schedule zone A1 and the branching end location 622.

Based on the map information, the road assessing unit 233 also determines that a branching road 70 exists between the current location P1 of the vehicle 10 and the connecting location 62, which is located on the same side of the traveling direction of the vehicle 10 as the branching road 60 and can be exited by the vehicle 10.

The start location L11 of the lane change schedule zone L1 is before the connecting location 72 where the branching road 70 connects with the road 50. Therefore, the start location changing unit 235 changes the start location L11 of the lane change schedule zone L1 to the branching end location 722 of the connecting location 72, in the direction in which the road 50 extends, as shown in FIG. 7. The start location changing unit 235 may also change the start location L11 of the lane change schedule zone L1 to the branching start location 721 of the connecting location 72. The start location changing unit 235 may also change the start location L11 of the lane change schedule zone L1 to a location between the branching start location 721 and the branching end location 722 (for example, the midpoint location), of the branching location 72. Or if the start location of the lane change schedule zone L1 is in the branching location 72, the start location changing unit 235 may change the start location of the lane change schedule zone L1 to the branching end location 722 of the connecting location 72.

The lane change schedule zone setting unit 234 sets the lane change schedule zone L1 where the start location L11 has been changed, on the traffic lane 51. The lane change schedule zone L1 is a zone on the traffic lane 51 between the branching end location 722 of the connecting location 72 and the branching end location 622 of the connecting location 62. The start location L11 of the lane change schedule zone L1 matches the branching end location 722 of the connecting location 72 in the direction in which the road 50 extends. The end location L12 of the lane change schedule zone L1 matches the branching end location 622 in the direction in which the road 50 extends.

The length of the lane change schedule zone L1 is shorter than the lane change schedule zone L1 prior to change of the start location L11. For this embodiment, therefore, the lane change schedule zone setting unit 234 uses the entire lane change schedule zone L1 as the manual lane change schedule zone M2, from the viewpoint of ensuring movement between lanes. However, the lane change schedule zone setting unit 234 may also use the entire lane change schedule zone L1 as the automatic lane change schedule zone. The lane change schedule zone setting unit 234 may situate the automatic lane change schedule zone and manual lane change schedule zone in the lane change schedule zone L1 in that order from the front in the traveling direction of the vehicle 10.

The lane change schedule zone setting unit 234 then adds to the traveling lane plan a notification to the driver of the moving plan information representing the plan to move the vehicle 10 from the traffic lane 51 of the road 50 to the traffic lane 61 of the branching road 60, while the vehicle 10 is traveling in the lane change schedule zone L1. The drive planning device 15 also adds to the driving plan a notification to the driver of moving plan information, in the lane change schedule zone L1.

While the vehicle 10 is traveling in the lane change schedule zone L1, the vehicle control device 16 notifies the driver of the moving plan information representing the plan to move the vehicle 10 from the traffic lane 51 of the road 50 to the traffic lane 61 of the branching road 60, by way of the UI 5, based on the driving plan. The vehicle control device 16 also flashes a turn signal to notify the vehicle 10 surroundings of the plan for the vehicle 10 to move from the traffic lane 51 of the road 50 to the traffic lane 61 of the branching road 60.

While the vehicle 10 is traveling in the manual lane change schedule zone of the lane change schedule zone L1, the vehicle control device 16, by way of the UI 5, notifies the driver of a movement request for moving from the traffic lane 51 of the road 50 to the traffic lane 61 of the branching road 60 by manual control. Operation of the vehicle 10 is in an automatic control state, and the vehicle control device 16 controls the steering wheel, drive unit or brake according to the amount of driver-operated steering, and the accelerator or brake level. In the manual lane change schedule zone, the driver operates the vehicle 10 by manual control to allow movement from the traffic lane 51 of the road 50 to the traffic lane 61 of the branching road 60, at the branching location 62.

The start location L11 of the lane change schedule zone L1 is changed to the branching end location 722 of the connecting location 72. Therefore, the driver is not notified of moving plan information representing the plan for the vehicle 10 to move from the traffic lane 51 of the road 50 to the traffic lane 61 of the branching road 60, before the vehicle 10 passes the branching end location 722 of the connecting location 72. The driver is only notified of the plan for the vehicle 10 to move from the traffic lane 51 of the road 50 to the traffic lane 61 of the branching road 60 after the vehicle 10 has passed the connecting location 72.

Since the vehicle control device of this embodiment notifies the driver that the vehicle is to move between lanes after the vehicle has passed the second connecting location (for example, the connecting location 72), as explained above, it can avoid misunderstanding by the driver that the vehicle is to exit to a second road at the second connecting location (for example, the branching road 70).

A second embodiment of the vehicle control device will now be described with reference to FIG. 8. The explanation of the first embodiment is to be applied for any aspects of the second embodiment that are not explained here.

For this embodiment, the processor 23 of the traveling lane planning device 14 comprises a start location correcting unit 236 (see FIG. 3). The start location correcting unit 236 moves the start location of the lane change schedule zone to a more front side location (forward location) when it is estimated that the first connecting location can be recognized by the driver at the second connecting location, than when it is estimated that the first connecting location cannot be recognized by the driver at the second connecting location, based on the navigation route R and map information.

Figure 8:
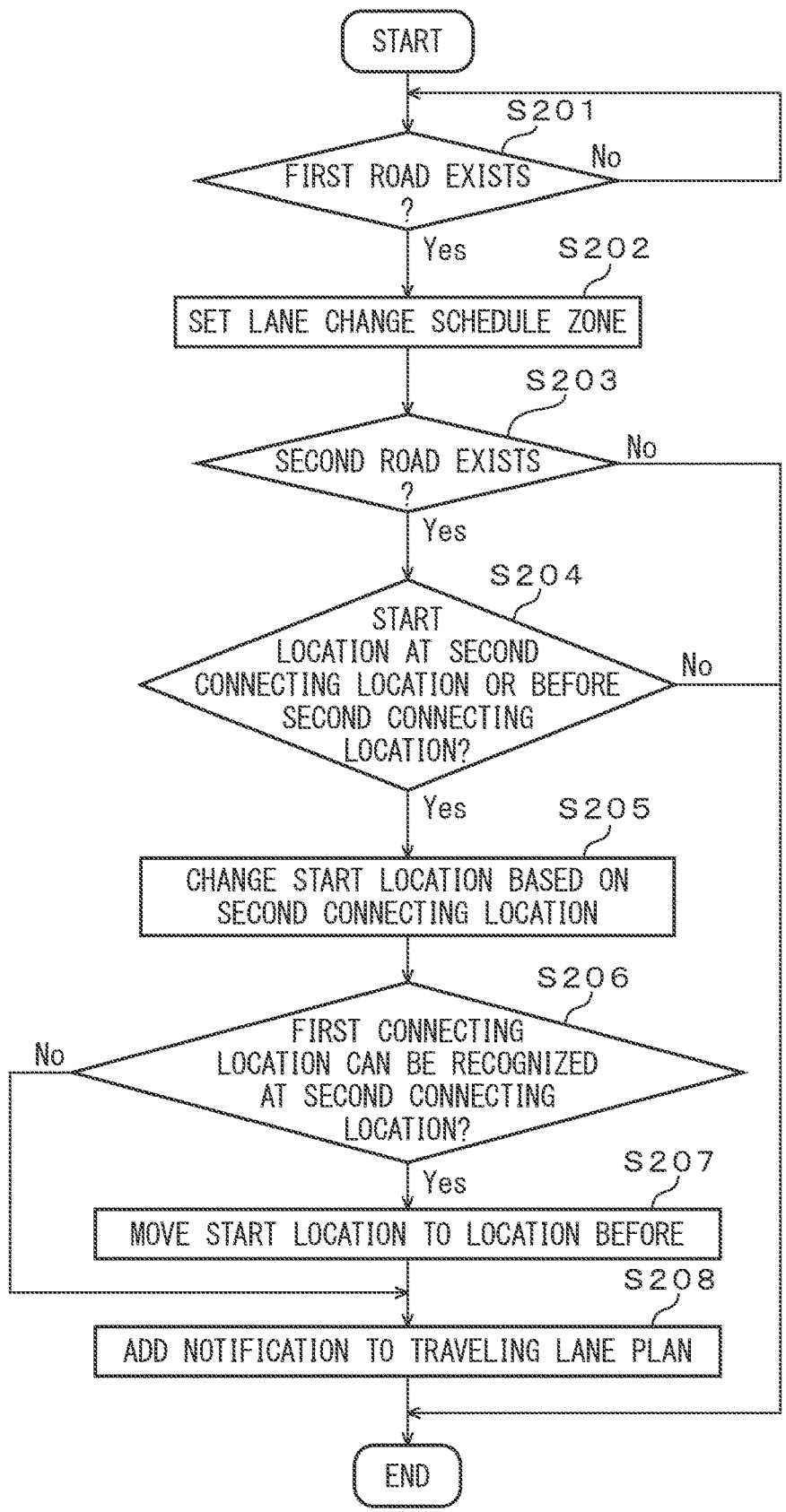
FIG. 8 is an example of an operation flow chart for vehicle control processing by a vehicle control system according to a second embodiment.

FIG. 8 is an example of an operation flow chart for vehicle control processing by the vehicle control system of the second embodiment. The operation flow chart for this embodiment differs from the first embodiment described above in step S206 and step S207. Operation in steps S201 to S205 and step S208 of this embodiment is the same as steps S101 to S106 of the first embodiment.

In step S206, the start location correcting unit 236 determines whether or not it is estimated that the first connecting location can be recognized by the driver at the second connecting location, based on the navigation route R and map information.

When it is estimated that recognition is possible (step S206—Yes), the start location correcting unit 236 moves the start location of the lane change schedule zone to a more front side location in the traveling direction of the vehicle 10 (step S207). Processing then moves to step S208.

When it is not estimated that recognition is possible (step S206—No), the start location correcting unit 236 does not move the start location of the lane change schedule zone. Processing then moves to step S208.

For example, when the road 50 in which the vehicle 10 is traveling is left side traffic, as shown in FIG. 7, and the road 50 curves toward the right in the zone before the branching location 72, the branching location 62 estimates that the recognition is possible by the driver at the branching location 72. When the road 50 curves toward the right at greater than a predetermined curvature radius from the branching location 72 to the branching location 62, the start location correcting unit 236, referring to the map information, may estimate that the branching location 62 can be recognized by the driver at the branching location 72. Alternatively, when the distance between the branching location 62 and branching location 72 is less than a predetermined distance, the start location correcting unit 236 may estimate that the branching location 62 can be recognized by the driver at the branching location 72.

The start location correcting unit 236 may also move the start location L11 of the lane change schedule zone L1 from the branching end location 722 to the branching start location 721, for example. Alternatively, the start location correcting unit 236 may move the start location L11 of the lane change schedule zone L1 from the branching end location 722 to a location between the branching start location 721 and the branching end location 722 (for example, the midpoint location). The start location correcting unit 236 may also move the start location L11 of the lane change schedule zone L1 to a point before the branching start location 721.

When the road 50 curves toward the right at less than a predetermined curvature radius from the branching location 72 to the branching location 62, or the road 50 continues straight ahead, or the road 50 curves toward the left, the start location correcting unit 236, referring to the map information, estimates that the branching location 62 cannot be recognized by the driver at the branching location 72. When the distance between the branching location 62 and branching location 72 is equal to or greater than a predetermined distance, the start location correcting unit 236 may likewise estimate that the branching location 62 cannot be recognized by the driver at the branching location 72.

As explained above, when the vehicle control device of the embodiment has estimated that the first connecting location (for example, the connecting location 62) can be recognized by the driver at the second connecting location (for example, the connecting location 72), the driver is unlikely to misunderstand that exiting is onto the second road (for example, the branching road 70) at the second connecting location, and therefore the start location of the lane change schedule zone is moved toward the front side, lengthening the lane change schedule zone. This is expected to allow the vehicle 10 to more reliably execute the lane change. The vehicle control device of this embodiment exhibits the same effect for the first embodiment as well.

The vehicle control device, the computer program for vehicle control and the method for controlling a vehicle according to the embodiment described above may incorporate appropriate modifications that are still within the gist of the disclosure. Moreover, the technical scope of the disclosure is not limited to these embodiments, and includes the invention and its equivalents as laid out in the Claims.

For example, in the embodiment described above the first road was the branching road and the first connecting location was the connecting location between the traveling road and the branching road, but the first connecting location may instead be an intersection, and the first road may be a road where the vehicle is scheduled to turn left from the traveling road at that intersection. Alternatively, the second connecting location may be an intersection, and the second road may be a road where the vehicle can turn left from the traveling road at that intersection. Similarly, the first connecting location may be an intersection, and the first road may be a road where the vehicle is scheduled to turn right from the traveling road at that intersection. Alternatively, the second connecting location may be an intersection, and the second road may be a road where the vehicle can turn right from the traveling road at that intersection. In this case, the lane change schedule zone functions as a left turn scheduling zone or right turn scheduling zone for movement from the lane in which the vehicle is traveling on the traveling road, to a lane on the road after a left turn or right turn.

The lane change schedule zone setting unit may also set the lane change schedule zone to be an automatic lane change schedule zone of a predetermined length (such as 50 m) and a manual lane change schedule zone of a predetermined length (such as 150 m), in that order on the traffic lane. In this case, if the end location of the automatic lane change schedule zone is before the first connecting location after the start location of the lane change schedule zone has been changed to the second connecting location, the lane change schedule zone setting unit may set the entire new lane change schedule zone to be the manual lane change schedule zone.

The invention claimed is:

1. A vehicle control device comprising:
a processor configured to
  determine whether or not a first road where the vehicle is to exit from the traveling road on which the vehicle is traveling exists within a predetermined driving zone of a navigation route, based on the current location of the vehicle, the navigation route and map information, and determine whether or not a second road that is located on the same side of the traveling direction of the vehicle as the first road and can be exited by the vehicle exists between the current location of the vehicle and a first connecting location where the traveling road and the first road are connected, based on the map information,
  set a lane change schedule zone on a traveling lane based on a first connecting location, when the first road exists,
  change a start location of the lane change schedule zone based on a second connecting location where the second road connects with the traveling road, when the second road exists and the start location of the lane change schedule zone is at the second connecting location, or before the second connecting location,
  notify the driver of the plan to move the vehicle between lanes via a notification unit, while the vehicle is traveling in the lane change schedule zone; and
  move the start location of the lane change schedule zone to a more front side location when it is estimated that the first connecting location can be recognized by the driver at the second connecting location, than when it is estimated that the first connecting location cannot be recognized by the driver at the second connecting location, based on the navigation route and the map information.

2. The vehicle control device according to claim 1, wherein the processor is further configured to change the start location of the lane change schedule zone to the second connecting location, and
  the processor is further configured to set the lane change schedule zone between the first connecting location and the second connecting location as the lane change schedule zone for movement between lanes by automatic control, when the start location of the lane change schedule zone has been changed to the second connecting location.

3. The vehicle control device according to claim 1, wherein the processor is further configured to change a start location of the lane change schedule zone to the second connecting location, and
  the processor is further configured to set the lane change schedule zone between the first connecting location and the second connecting location as the lane change schedule zone for movement between lanes by manual control, when the start location of the lane change schedule zone has been changed to the second connecting location.

4. A computer-readable, non-transitory storage medium storing a computer program for vehicle control, which causes a processor execute a process, the process comprising:
  determining whether or not a first road where the vehicle is to exit from the traveling road on which the vehicle is traveling exists within a predetermined driving zone of a navigation route, based on the current location of the vehicle, the navigation route and map information;
  setting a lane change schedule zone on a traveling lane based on a first connecting location where the traveling road and the first road are connected, when the first road exists;
  determining whether or not a second road that is located on the same side of the traveling direction of the vehicle as the first road and can be exited by the vehicle exists between the current location of the vehicle and the first connecting location, based on the map information;
  changing a start location of the lane change schedule zone based on a second connecting location where the second road connects with the traveling road, when a second road exists and the start location of the lane change schedule zone is at the second connecting location, or before the second connecting location;
  notifying the driver of the plan to move the vehicle between lanes via a notification unit, while the vehicle is traveling in the lane change schedule zone; and
  moving the start location of the lane change schedule zone to a more front side location when it is estimated that the first connecting location can be recognized by the driver at the second connecting location, than when it is estimated that the first connecting location cannot be recognized by the driver at the second connecting location, based on the navigation route and the map information.

5. A method for controlling a vehicle carried out by a vehicle control device, the method comprising:
  determining whether or not a first road where the vehicle is to exit from the traveling road on which the vehicle is traveling exists within a predetermined driving zone of a navigation route, based on the current location of the vehicle, the navigation route and map information;
  setting a lane change schedule zone on a traveling lane based on a first connecting location where the traveling road and the first road are connected, when the first road exists;
  determining whether or not a second road that is located on the same side of the traveling direction of the vehicle as the first road and can be exited by the vehicle exists between the current location of the vehicle and the first connecting location, based on the map information,
  changing a start location of the lane change schedule zone based on a second connecting location where the second road connects with the traveling road, when a second road exists and the start location of the lane change schedule zone is at the second connecting location, or before the second connecting location;
  notifying the driver of the plan to move the vehicle between lanes via a notification unit, while the vehicle is traveling in the lane change schedule zone; and moving the start location of the lane change schedule zone to a more front side location when it is estimated that the first connecting location can be recognized by the driver at the second connecting location, than when it is estimated that the first connecting location cannot be recognized by the driver at the second connecting location, based on the navigation route and the map information.

* * * * *